(12) United States Patent
Bartel et al.

(10) Patent No.: US 10,766,207 B2
(45) Date of Patent: Sep. 8, 2020

(54) THERMOFORMED CASCADES FOR JET ENGINE THRUST REVERSERS

(71) Applicant: The Boeing Company, Chicago, IL (US)

(72) Inventors: Aaron William Bartel, Mountlake Terrace, WA (US); Robert Darel Morrow, Milton, WA (US); Alan James Scott, Kent, WA (US); Alexandre D. Curaudeau, Kirkland, WA (US); Tunde Abiodun Olaniyan, Bothell, WA (US); Leonard Joseph England, Seattle, WA (US); Randall Dow Wilkerson, O'Fallon, MO (US); Robin L. Westberg, Ramona, CA (US)

(73) Assignee: The Boeing Company, Chicago, IL (US)

( * ) Notice: Subject to any disclaimer, the term of this patent is extended or adjusted under 35 U.S.C. 154(b) by 162 days.

(21) Appl. No.: 15/872,556

(22) Filed: Jan. 16, 2018

(65) Prior Publication Data

US 2018/0236720 A1  Aug. 23, 2018

Related U.S. Application Data

(62) Division of application No. 14/278,292, filed on May 15, 2014, now Pat. No. 9,895,840.

(51) Int. Cl.
*B29C 43/14* (2006.01)
*F02K 1/72* (2006.01)
(Continued)

(52) U.S. Cl.
CPC .......... *B29C 66/634* (2013.01); *B29C 33/485* (2013.01); *B29C 33/505* (2013.01);
(Continued)

(58) Field of Classification Search
CPC .................. B29C 33/485; B29C 33/52; B29C 2043/3665; B29C 2043/3668;
(Continued)

(56) References Cited

U.S. PATENT DOCUMENTS 2,345,200 A  3/1948 Iknayan
3,795,559 A  3/1974 Horn et al.
(Continued)

FOREIGN PATENT DOCUMENTS

CN    102741045 A    10/2012
EP       219889 A2    4/1987
(Continued)

OTHER PUBLICATIONS

Federal Institute of Industrial Property of Russia Office Action of the Substantive Examination and English Translation, dated Sep. 20, 2018, regarding Application No. 2015108680106, 16 pages.
(Continued)

*Primary Examiner* — Atul P. Khare
(74) *Attorney, Agent, or Firm* — Yee & Associates, P.C.

(57) ABSTRACT

A cascade for a jet engine thrust reverser is fabricated by co-consolidating pre-consolidated thermoplastic strongbacks and vanes. The strongbacks are reinforced with continuous fibers, and the vanes are reinforced with discontinuous fibers.

20 Claims, 12 Drawing Sheets

(51) Int. Cl.

| | |
|---|---|
| *B29C 65/00* | (2006.01) |
| *B29C 53/82* | (2006.01) |
| *B29C 33/48* | (2006.01) |
| *B29C 70/34* | (2006.01) |
| *B29C 33/50* | (2006.01) |
| *B29C 33/52* | (2006.01) |
| *B29C 70/08* | (2006.01) |
| *F02K 1/64* | (2006.01) |
| *F01D 5/28* | (2006.01) |
| *F02K 1/62* | (2006.01) |
| *B29C 43/36* | (2006.01) |
| *B29L 31/00* | (2006.01) |
| *B29K 101/12* | (2006.01) |
| *B29K 105/08* | (2006.01) |
| *B29K 105/12* | (2006.01) |
| *B29L 31/30* | (2006.01) |

(52) U.S. Cl.
CPC ............. *B29C 33/52* (2013.01); *B29C 43/14* (2013.01); *B29C 53/822* (2013.01); *B29C 53/824* (2013.01); *B29C 66/494* (2013.01); *B29C 70/081* (2013.01); *B29C 70/342* (2013.01); *F01D 5/282* (2013.01); *F02K 1/625* (2013.01); *F02K 1/64* (2013.01); *F02K 1/72* (2013.01); *B29C 2043/3668* (2013.01); *B29K 2101/12* (2013.01); *B29K 2105/0872* (2013.01); *B29K 2105/12* (2013.01); *B29L 2031/3076* (2013.01); *B29L 2031/737* (2013.01); *F05D 2300/603* (2013.01); *Y02T 50/672* (2013.01)

(58) Field of Classification Search
CPC ... B29C 52/822; B29C 52/824; B29C 66/494; B29C 66/634
See application file for complete search history.

(56) References Cited

U.S. PATENT DOCUMENTS

| | | | |
|---|---|---|---|
| 4,165,609 A | 8/1979 | Rudolph | |
| 4,183,478 A | 1/1980 | Rudolph | |
| 4,596,621 A | 6/1986 | Nawaz | |
| 4,722,821 A | 2/1988 | Vermilye | |
| 4,778,110 A | 10/1988 | Sankey et al. | |
| 4,852,805 A | 8/1989 | Vermilye | |
| 4,892,462 A | 1/1990 | Barbier et al. | |
| 5,128,192 A | 7/1992 | Narasaki | |
| 5,152,860 A | 10/1992 | Grossman et al. | |
| 5,348,601 A | 9/1994 | Ray | |
| 5,356,692 A * | 10/1994 | Perez | B29C 33/30 118/33 |
| 5,399,395 A | 3/1995 | Forman et al. | |
| 5,567,500 A * | 10/1996 | Marshall | B29C 70/085 428/116 |
| 5,576,079 A * | 11/1996 | Forman | B29C 33/301 428/34.1 |
| 5,624,618 A | 4/1997 | Forman et al. | |
| 5,789,060 A | 8/1998 | Marshall et al. | |
| 5,981,025 A * | 11/1999 | Marshall | B29C 70/085 428/116 |
| 6,557,338 B2 | 5/2003 | Holme et al. | |
| 6,830,718 B2 | 12/2004 | Maumus et al. | |
| 7,007,454 B2 | 5/2006 | Dehu et al. | |
| 7,998,299 B2 | 8/2011 | McCarville et al. | |
| 8,333,858 B2 | 12/2012 | Rubin et al. | |
| 8,484,944 B2 | 7/2013 | Urban et al. | |
| 8,608,890 B2 | 12/2013 | Everhart et al. | |
| 8,974,217 B2 * | 3/2015 | Everhart | B29C 33/485 425/389 |
| 9,086,034 B2 | 7/2015 | Aten et al. | |
| 9,120,246 B2 | 9/2015 | Oldroyd et al. | |
| 9,145,277 B2 | 9/2015 | Kendrick et al. | |
| 9,211,618 B2 | 12/2015 | Hethcock et al. | |
| 9,314,941 B2 | 4/2016 | Wallen et al. | |
| 2001/0001409 A1 | 5/2001 | Weight et al. | |
| 2012/0021165 A1 | 1/2012 | Hethcock et al. | |
| 2012/0036716 A1 | 2/2012 | Urban et al. | |
| 2012/0124994 A1 | 5/2012 | Hommes et al. | |
| 2016/0186689 A1 | 6/2016 | Bartel et al. | |

FOREIGN PATENT DOCUMENTS

| | | | |
|---|---|---|---|
| EP | 2581593 | A2 | 4/2013 |
| JP | H07173300 | A | 7/1995 |
| JP | 2013067051 | A | 4/2013 |
| RU | 2172434 | C2 | 8/2001 |

OTHER PUBLICATIONS

Extended European Search Report, dated Feb. 4, 2016, regarding Application No. EP15167817.4, 11 pages.

Canadian Intellectual Property Office Examination Report, dated Mar. 24, 2016, regarding Application No. 2,884,995, 3 pages.

Canadian Intellectual Property Office Examination Report, dated Jan. 31, 2017, regarding Application No. 2,884,995, 3 pages.

State Intellectual Property of China First Notification of Office Action, dated Jul. 3, 2017, regarding Application No. 201510249918. 4, 13 pages.

State Intellectual Property of China Second Notification of Office Action, dated Nov. 6, 2017, regarding Application No. 201510249918. 4, 12 pages.

Office Action, dated Feb. 3, 2017, regarding U.S. Appl. No. 14/278,292, 20 pages.

Final Office Action, dated Jul. 5, 2017, regarding U.S. Appl. No. 14/278,292, 14 pages.

Notice of Allowance, dated Oct. 10, 2017, regarding U.S. Appl. No. 14/278,292, 11 pages.

Canadian Intellectual Property Office Communication and Office Action, dated Feb. 26, 2019, regarding Application No. 2993697, 4 pages.

* cited by examiner

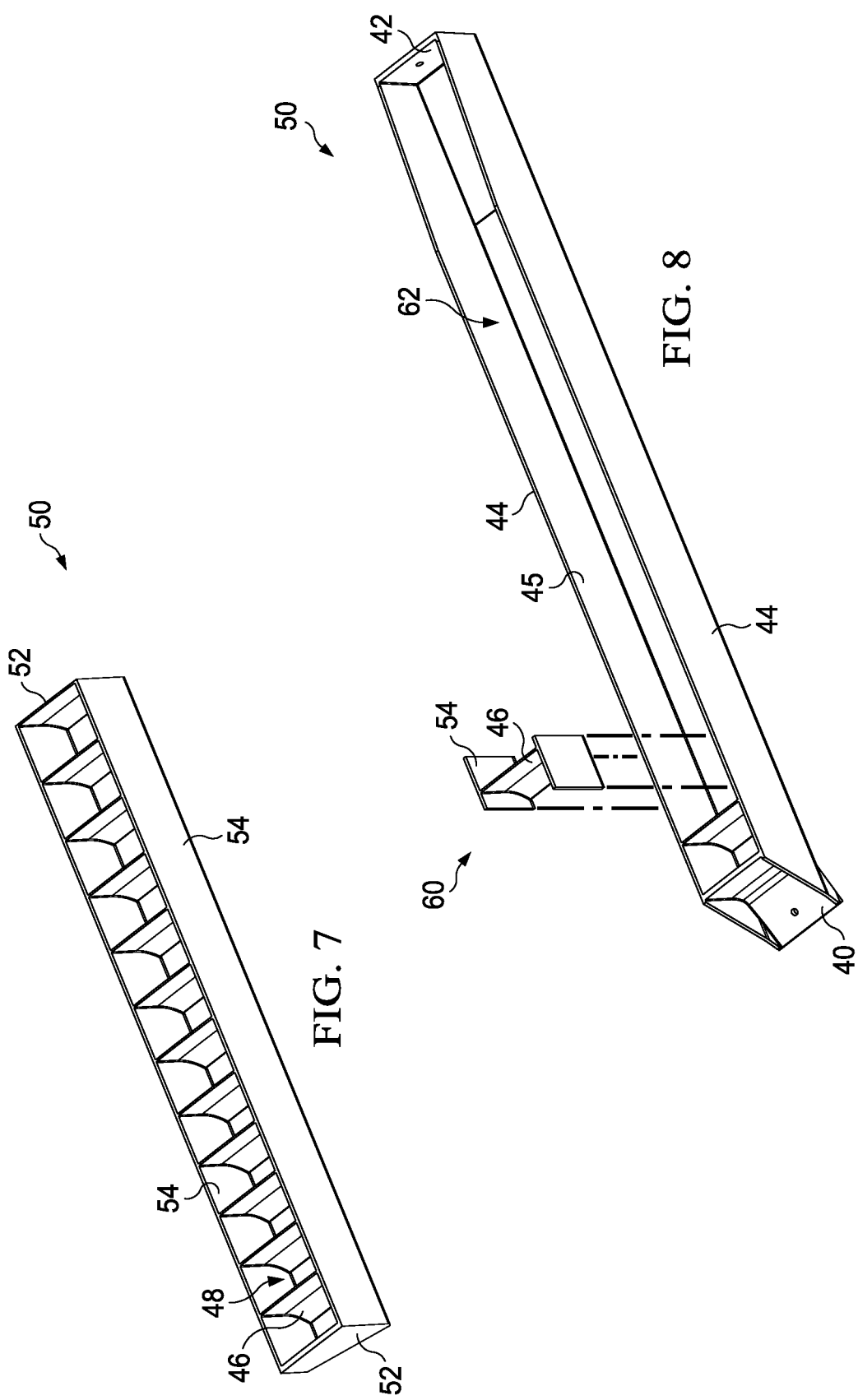

THERMOFORMED CASCADES FOR JET ENGINE THRUST REVERSERS

This application is a divisional application of U.S. patent application Ser. No. 14/278,292, filed May 15, 2014, subsequently issued as U.S. Pat. No. 9,895,840.

BACKGROUND INFORMATION

1. Field

The present disclosure generally relates to thrust reversers for jet engines, and deals more particularly with cascade type thrust reversers, as well as a method of fabricating cascades.

2. Background

Airplanes with jet engines are often equipped with thrust reversers that increase drag on the airplane during landings, thereby reducing the speed of the aircraft. A thrust reverser increases drag by effectively reversing the flow of exhaust gases through the jet engine. In one type of thrust reverser, referred to as a cascade-type, a transcowl on the jet engine nacelle translates rearwardly to expose a cascade formed by multiple open grid panels. Closing of a blocker door causes a bypass portion of the airflow through the engine to be diverted through series of circumferentially arranged cascade vanes in the grid panels which are oriented to redirect the airflow forwardly and thereby produce reverse thrust.

The fabrication of cascade grid panels is time consuming, labor intensive and therefore expensive. Current cascade grid panels are fabricated using fiber reinforced thermoset resins which require many processing steps and specialized equipment. For example, use of thermosets require thawing of prepreg, pre-curing of strongbacks, hand layup of the individual vanes, compression molding to co-cure the strongbacks to the vanes, and post curing.

Accordingly, there is a need for a cascade for a jet engine thrust reverser that is simple in construction and is less expensive to produce. There is also a need for a low cost method of fabricating the cascade which reduces touch labor and requires fewer processing steps as well as less processing equipment.

SUMMARY

The disclosed embodiments provide a light weight cascade for use in thrust reversers that is simple to manufacture and requires fewer processing steps to produce. Complex, three-dimensional, all thermoplastic composite cascades can be rapidly manufactured using continuous fiber strongbacks co-consolidated with discontinuous long fiber thermoplastic composite grid panels. The strongbacks may be fabricated separately from the grid panels, thereby improving manufacturing flow. The strongbacks and the vanes in the grid panels may be molded to any desired shape in order to redirect the bypass air in any desired direction. The grid panels may be fabricated either individually or in modular subassembly groups. Because the pre-consolidated strongbacks and grid panels can be fabricated as individual pieces, they can be combined into a final, high-temperature consolidation tooling with open slots to accurately index the rigid strongbacks in relationship to the vanes of the individual grid panels. The desired indexing may be achieved using a combination of alternating hard tool inserts and soluble mandrels.

According to one disclosed embodiment, a cascade is provided for a jet engine thrust reverser. The cascade comprises a plurality of strongbacks co-consolidated with a plurality of vanes. Each of the strongbacks is formed of a polymer resin having a continuous fiber reinforcement. Each of the vanes is formed of a polymer resin, such as a thermoplastic, having a discontinuous fiber reinforcement. The vanes may be arranged in a plurality of modular vane assemblies. The discontinuous fiber reinforcement includes randomly oriented, chopped fibers. The strongback assembly and the vanes are pre-consolidated prior to being consolidated with each other. The strongback assembly is reinforced with continuous fibers.

According to another disclosed embodiment, a method is provided of fabricating a cascade grid panel for a jet engine thrust reverser. The method comprises fabricating a plurality of thermoplastic vanes, fabricating a plurality of thermoplastic strongbacks, and co-consolidating the vanes and the strongbacks. Fabricating the thermoplastic vanes may be performed by compression molding a thermoplastic resin reinforced with discontinuous fibers. Fabricating the strongbacks may be performed by continuous compression molding a thermoplastic resin reinforced with continuous fibers. The co-consolidation is performed by loading the thermoplastic vanes and the thermoplastic strongbacks into compression mold tooling, heating each of the thermoplastic vanes and thermoplastic strongbacks, and co-consolidating the vanes and the strongbacks using the compression mold tooling to compress the thermoplastic vanes against the thermoplastic strongbacks. Loading the thermoplastic vanes and the thermoplastic strongbacks into the compression mold tooling includes placing a set of hard tool inserts into a first set of vane cavities, and placing a set of expandable soluble mandrels into a second set of vane cavities. The method may further comprise cooling the vanes and the strongbacks after they have been co-consolidated and removing the cascade grid panel from the compression mold tooling, including dissolving the soluble mandrels. The method may also include indexing the vanes relative to the strongbacks within the compression mold tooling. Indexing the vanes includes inserting a set of hard tool inserts into cavities formed by the vanes.

According to still another embodiment, an apparatus is provided for co-consolidating a plurality of strongbacks and a plurality of vanes. The apparatus comprises a tool including a plurality of hard tool inserts fixed in relationship to each other and capable of being inserted into a first set of cavities formed by the vanes. The apparatus further comprises a plurality of mandrels capable of being individually inserted into a second set of cavities formed by the vanes. The mandrels may be soluble. The tool includes a tool base and the plurality of hard tool inserts are fixed to the tool base.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 7 is an illustration of a perspective view of a modular vane assembly.

FIG. 8 is an illustration of a perspective view of an alternate embodiment of a vane assembly, showing the installation of individual vanes subassemblies.

DETAILED DESCRIPTION

Figure 1:
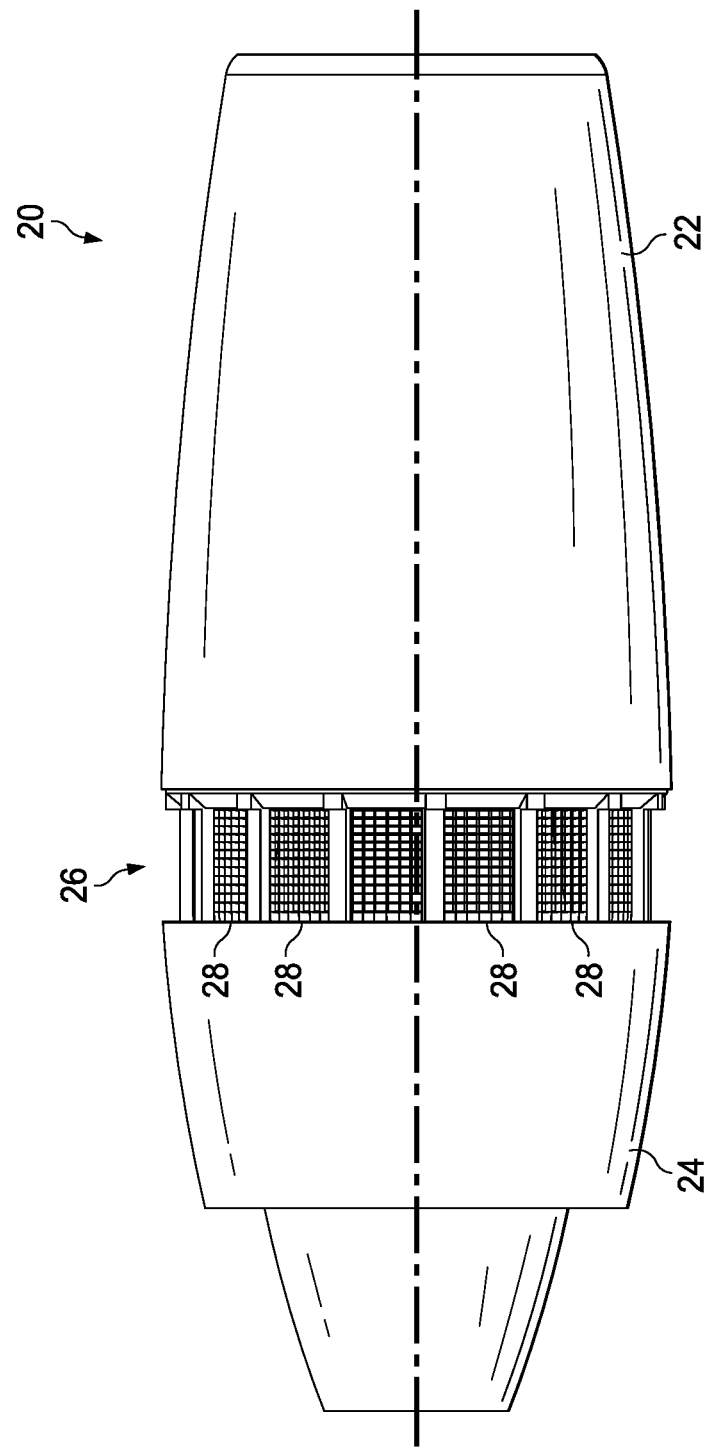
FIG. 1 is an illustration of a side elevational view of an airplane jet engine, a transcowl having shifted rearwardly to expose a cascade-type thrust reverser.
Figure 2:
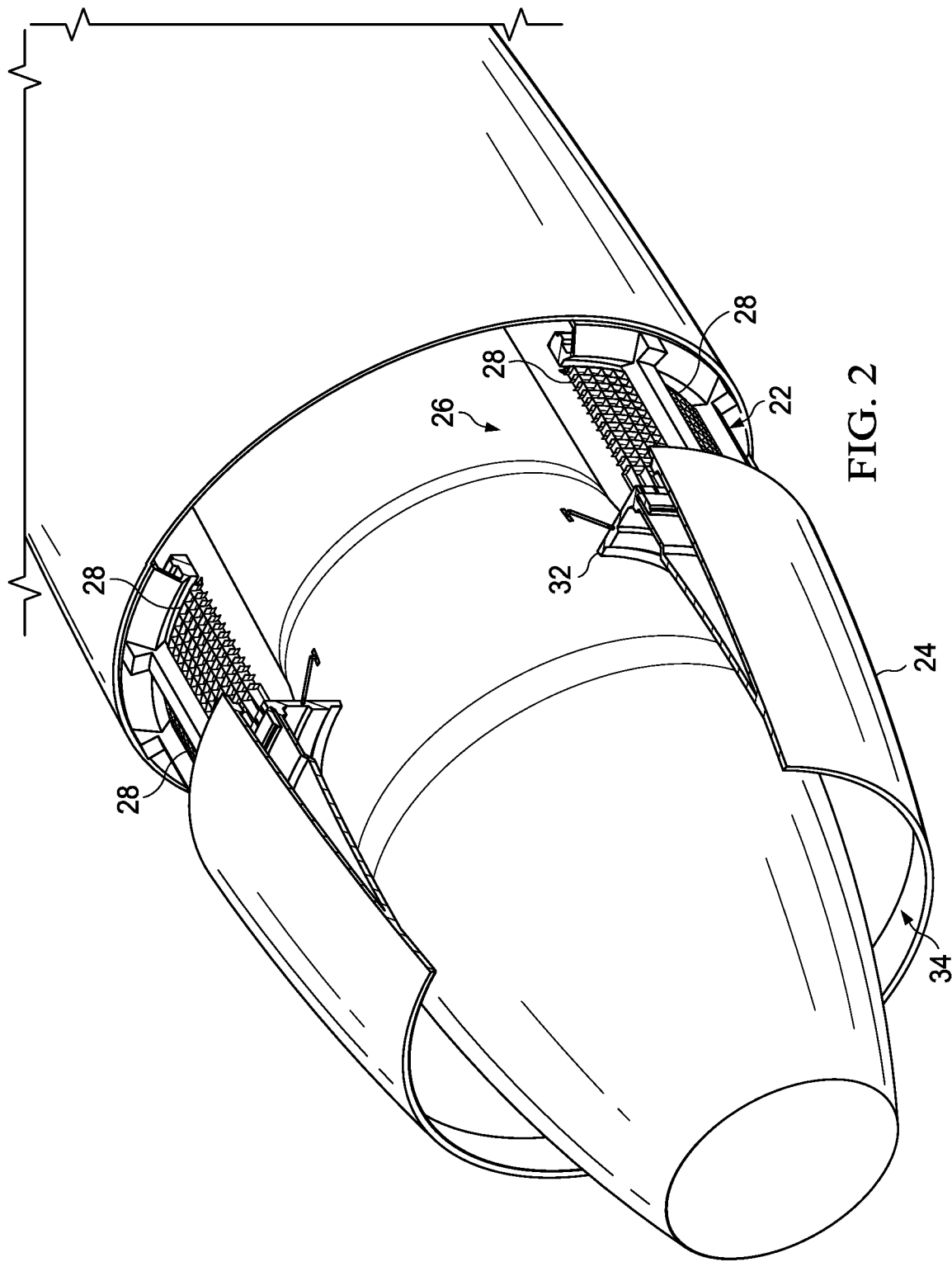
FIG. 2 is an illustration of a perspective view of the aft end of the jet engine shown in FIG. 1.
Figure 3:
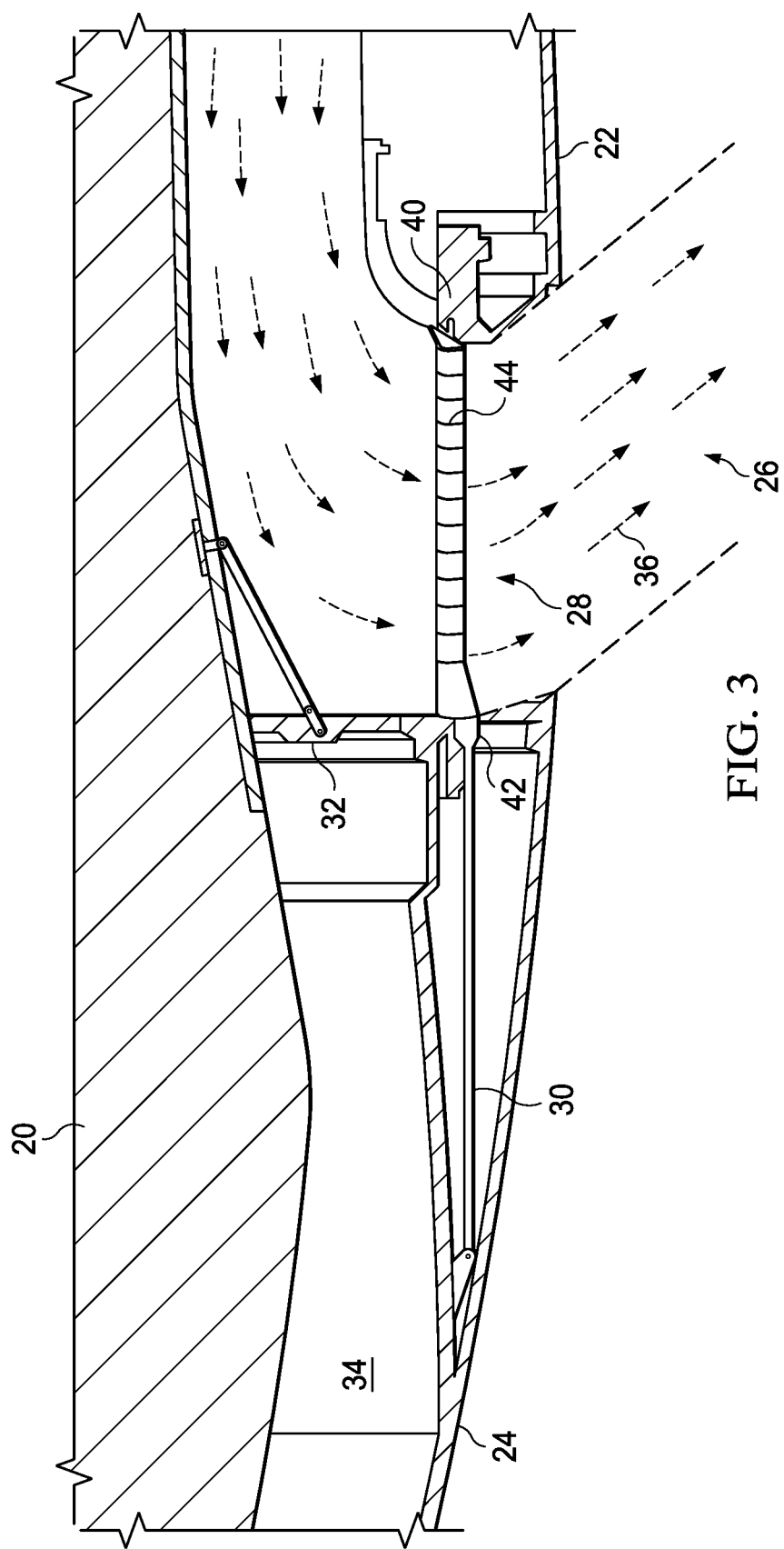
FIG. 3 is a longitudinal sectional view of a portion of the jet engine shown in FIGS. 1 and 2, illustrating airflow through the thrust reverser.

Referring first to FIGS. 1-3, an aircraft jet engine 20 includes an engine nacelle 22 and a transcowl that translates rearwardly to expose a cascade-type thrust reverser 26. The thrust reverser 26 comprises a plurality of circumferentially arranged, thrust reversing cascade grid panels 28, sometimes referred to as cascade baskets.

During normal flying operations, the transcowl is in a closed, forward position, joining the transcowl 24 with the nacelle 22, and thereby covering the cascade grid panels 28. During landing, the transcowl is moved from its closed position to its open, rearwardly extended position (shown in FIGS. 1-3) by means of actuator rods 30. Opening the transcowl 24 exposes the cascade grid panels 28 to the surrounding environment. With the transcowl 24 having been shifted to its open position, the thrust reverser 26 is activated by closing circumferentially located blocker doors 32. Closing the blocker doors 32 prevents the bypass exhaust from flowing in its normal direction out of the nozzle 34, forcing the exhaust through the cascade grid panels 28, as shown by the arrows 36 in FIG. 3. Each of the cascade grid panels 28 includes vanes 44 that direct the flow of the exhaust forward, and optionally radially outward, producing a reversal in the direction of the exhaust flow. This reversal of the exhaust flow results in a reversal of thrust that assists in slowing down the aircraft.

Figure 4:
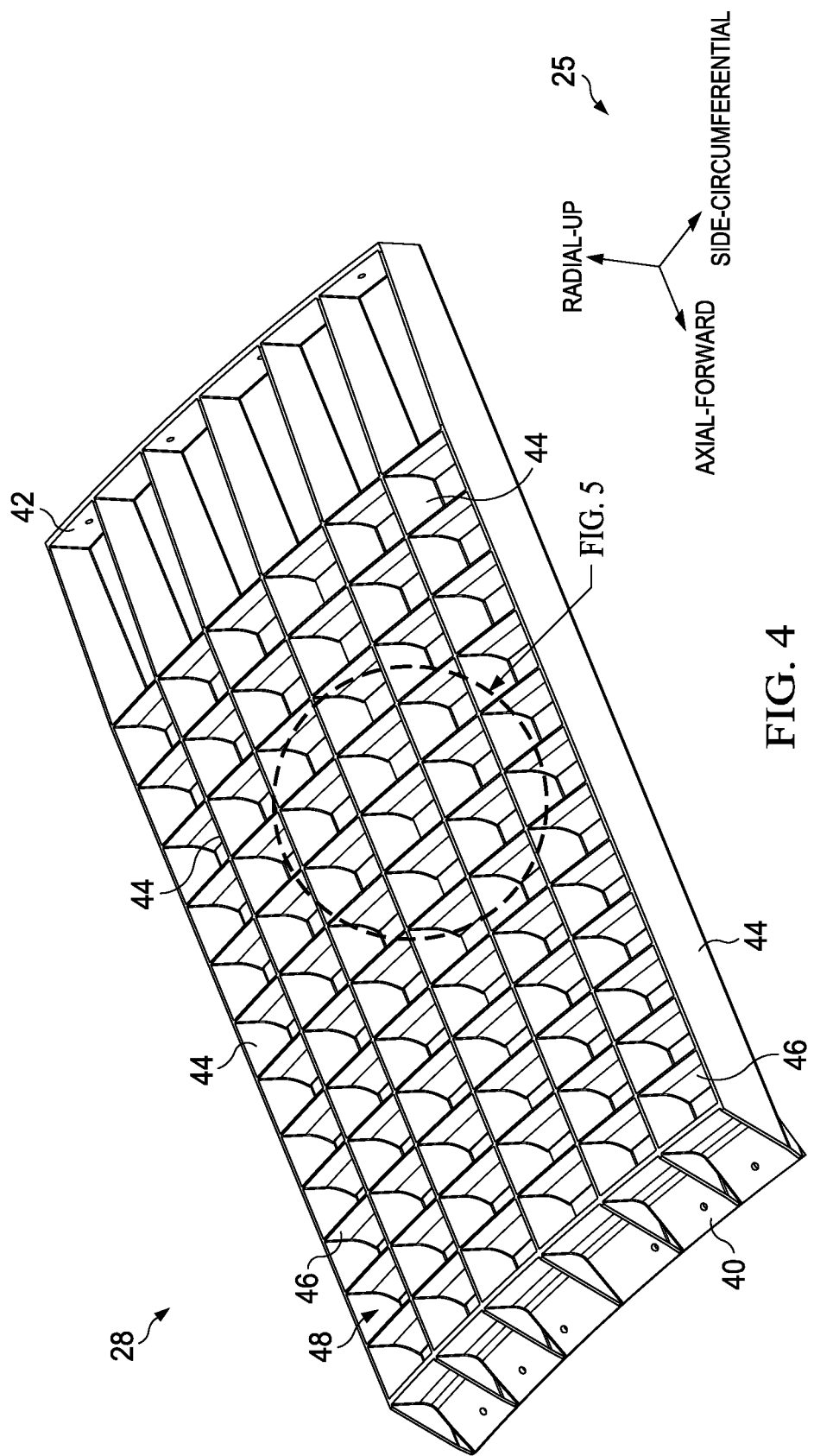
FIG. 4 is an illustration of a top, perspective view of a cascade grid panel forming part of the thrust reverser.
Figure 5:
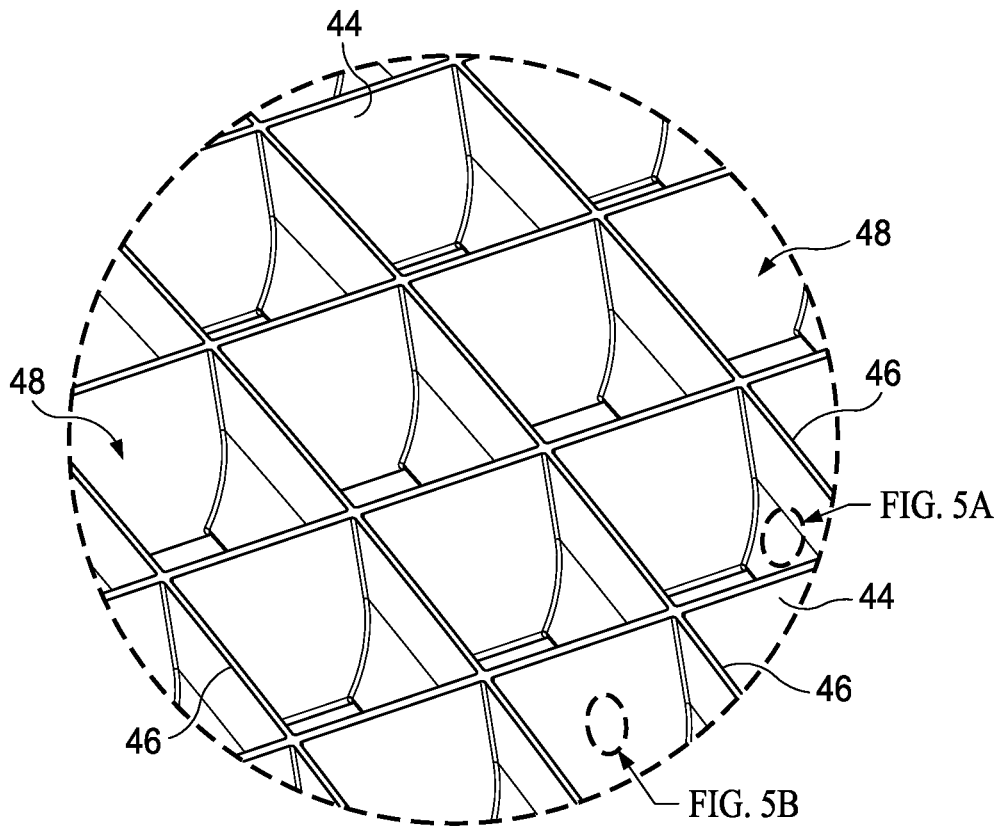
FIG. 5 is an illustration of the area designated as FIG. 5 in FIG. 4.

Attention is now directed to FIGS. 4 and 5 which illustrate additional details of one of the cascade grid panel 28, along with a related coordinate system 25 showing the axial-forward direction, the radial-up direction and the side-circumferential direction. The cascade grid panel 28 is curved in the side-circumferential direction, and comprises a plurality of axially extending strongbacks 44, a plurality of vanes 46 extending between the strongbacks 44, and fore and aft mounting flanges 40, 42 respectively. The mounting flanges 40, 42 allow the cascade grid panels 28 to be mounted side-by-side in a circumferential arrangement around the engine nacelle 22.

The strongbacks 44 are designed to react the majority of the load on the cascade grid panel 28, while the vanes 46 are designed to react relatively minimal loads during a reverse thrust procedure. The strongbacks include a later discussed a continuous fiber reinforcement, while the vanes 46 include a discontinuous fiber reinforcement. The strongbacks 44, together with the vanes 46, form a plurality of vane cavities 48 through which the bypass air flows and is redirected.

The strongbacks 44 extend generally parallel to each other and are spaced apart in the side-circumferential direction. In the disclosed embodiment, each of the strongbacks 44 is planar and is aligned with the radial-up direction, however in other embodiments, the strongbacks 44 may be not be planar and/or may be inclined a desired degree in order to direct the airflow in the side-circumferential direction. As will be discussed below in more detail, the strongbacks 44 are formed integral with the mounting flanges 40, 42. The vanes 46 are spaced apart from each other in the axial-forward direction and each may be inclined relative to the radial-up direction or be cup shaped (see FIG. 5) in order to redirect the bypass airflow in the axial-forward direction to produce reverse thrust.

Figure 5A:
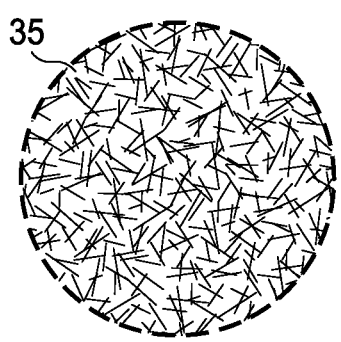
FIG. 5A is an illustration of the area designated as FIG. 5A in FIG. 5.
Figure 5B:
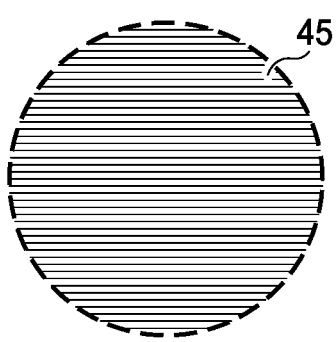
FIG. 5B is an illustration of the area designated as FIG. 5B in FIG. 5.

Referring now particularly to FIGS. 5, 5A and 5B, the strongbacks 44 and the vanes 46 may comprise a polymer resin such as a suitable fiber reinforced thermoplastic resin including, but not limited to PEI (polyetherimide) PPS (polyphenylene sulphide), PES (polyethersulfone), PEEK (polyetheretherketone), PEKK (polyetherketoneketone), and PEKK-FC (polyetherketoneketone-fc grade). As shown in FIG. 5A, the vanes 46 are reinforced with discontinuous long fibers 35 that may be randomly oriented. The discontinuous fibers 35 may include one or more of carbon, metal, glass or ceramic fibers, having lengths that are suitable for the application. For example, in one embodiment, the fibers 35 may be chopped flakes having a width and length of ½ inch×½ inch respectively, while in another embodiment the width and length may be 1/16 inch×½ inch respectively. The fibers 35 may have differing lengths and may have the same or different fiber thicknesses or diameters. The volume of the fibers relative to the thermoplastic matrix may vary with the performance requirements of the particular application. The selected thermoplastic composite material may be in the form of fabrics, tape semi-preg or other forms.

As shown in FIG. 5B, the strongbacks 44 along with the flanges 40, 42 may be reinforced with continuous unidirectional fibers 45 which may be the same as, or different from the material than the discontinuous fibers 35 used to reinforce the vanes 46. The strongbacks 44 and the flanges 40, 42 may be of multiple lamina having differing fiber orientations that are pre-consolidated together. As will be discussed below, the vanes 46 may be pre-consolidated and then later co-consolidated with the pre-consolidated strongbacks 44 in a compression molding operation.

Figure 6:
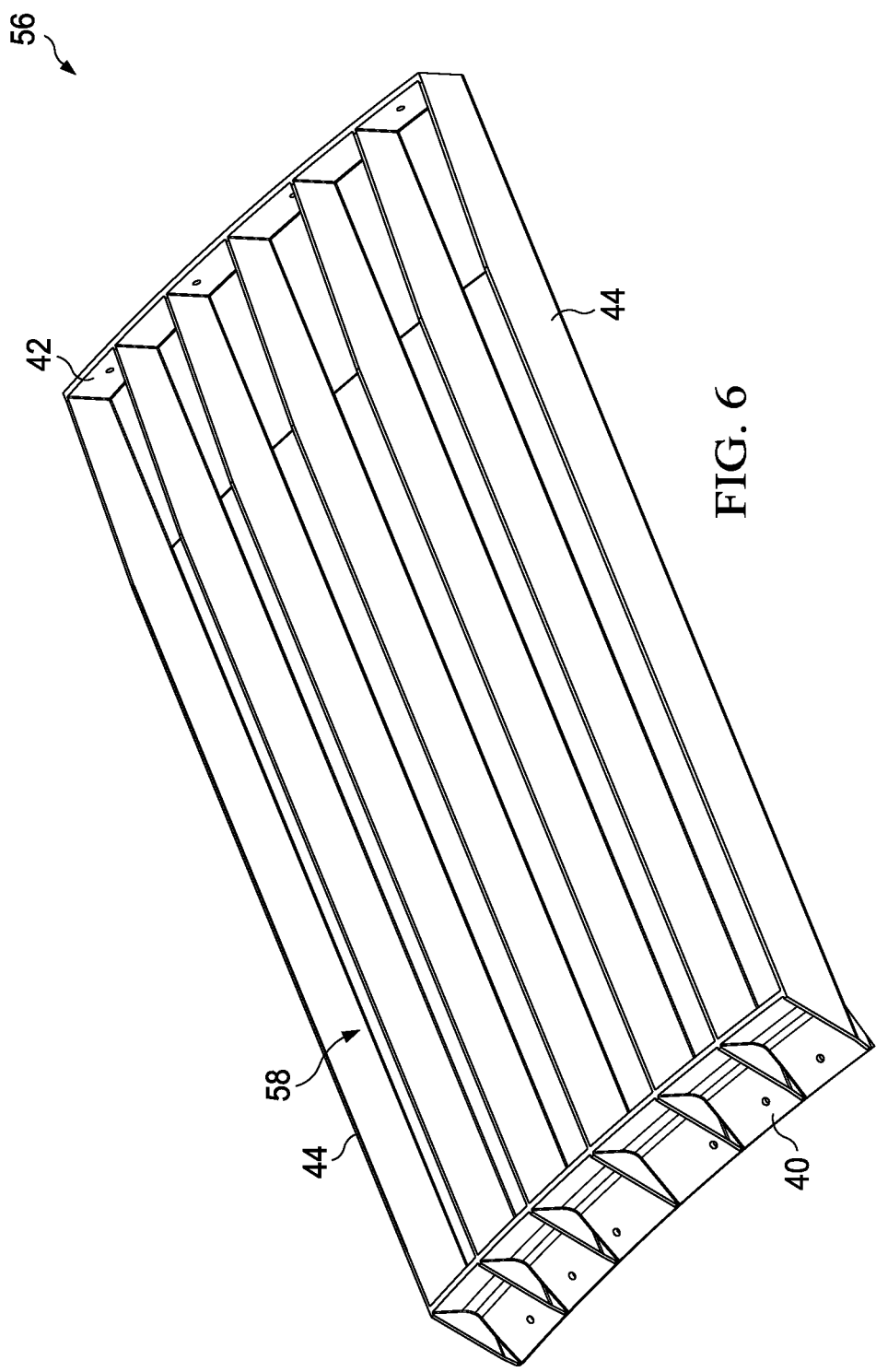
FIG. 6 is an illustration of a perspective view of a strongback assembly.

Referring now to FIG. 6, the thermoplastic strongbacks 44 along with the flanges 40, 42 may be fabricated as a single, pre-consolidated thermoplastic strongback assembly 56 using a suitable thermoforming forming process such as without limitation, continuous compression molding. The strongback assembly 56 is formed with open, strongback slots 58 between adjacent strongbacks 44 which extend in the axial direction. As previously discussed, the strongbacks 44 may be inclined in order to direct the bypass airflow toward the side-circumferential direction.

Referring to FIG. 7, the pre-consolidated thermoplastic vanes 46 may be fabricated as a plurality of unitary, pre-consolidated modular vane assemblies 50 each of which comprises a plurality of individual vanes 46 that are joined to spaced apart sidewalls 54 connected together at their ends by and end walls 52. The modular vane assemblies 50 have a geometry and dimensions that are substantially the same as the strongback slots 58. The modular vane assemblies 50 may be produced as unitary modules by compression molding a thermoplastic composite resin, including any of the fiber reinforced thermoplastics described earlier. In order to assemble the vane assemblies 50 with the strongback assembly 56, each of the vane assemblies 50 is placed in one of the strongback slots 58 and loaded into later discussed tooling that is used to co-consolidate the vane assemblies 50 and the strongback assemblies 56.

Attention is now directed to FIG. 8 which illustrates an alternate method of installing individual vanes 46 between adjacent strongbacks 44. In this embodiment, individual vane subassemblies 60 may be fabricated by compression molding or other thermoforming techniques. The individual vane subassemblies 60 are placed at the desired locations within the strongback slots 58 and indexed within suitable tooling to maintain the positions of the vane subassemblies 60 in relationship to the strongback assembly 56. Each of the vane subassemblies 60 includes a vane 46 having integrally molded sidewalls 54 which contact contacts and becomes co-consolidated with the strongbacks 44. Each of the vane subassemblies 60 is a pre-consolidated thermoplastic reinforced with discontinuous long fibers, as previously discussed.

Referring now to FIGS. 9-12, the strongback assembly 56 and the vane subassemblies 60 (or modular vane assemblies 50) are co-consolidated using a combination of hard tooling 70 and dissolvable tool inserts in the form of expandable soluble mandrels 78. The expandable soluble mandrels 78 may be formed of conventional materials that may be dissolved and washed away after the consolidation process is completed, as by subjecting the mandrels 78 to a dissolving liquid such as water. The expandable soluble mandrels 78 reduce tooling costs, however in some embodiments, the mandrels 78 may be hard tools, rather than soluble. The hard tooling 70 includes hard tool inserts 72 fixed on a tool base 74. The hard tool inserts 72 and the expandable soluble mandrels 78 have a cross-sectional geometry substantially matching that of the vane cavities 48. When heated either in an oven, a press or an autoclave, the tool inserts 72, 78, expand and thereby compress the sidewalls 54 of the vane subassemblies 60 against the strongbacks 44. The tooling and the pre-consolidated strongback assembly 56 and vane subassemblies 60 may be assembled using any of various techniques.

Figure 9:
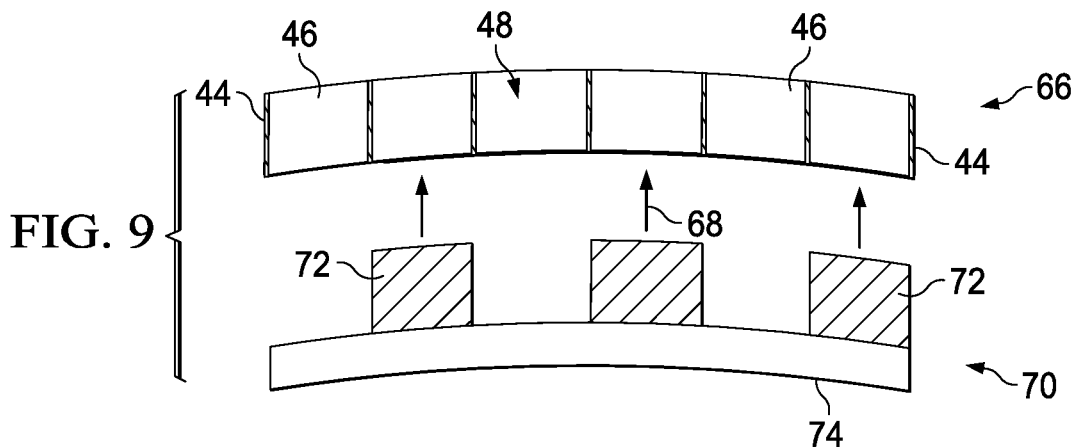
FIG. 9 is an illustration of a cross-sectional view showing a cascade grid panel about to be placed on hard tooling.
Figure 10:
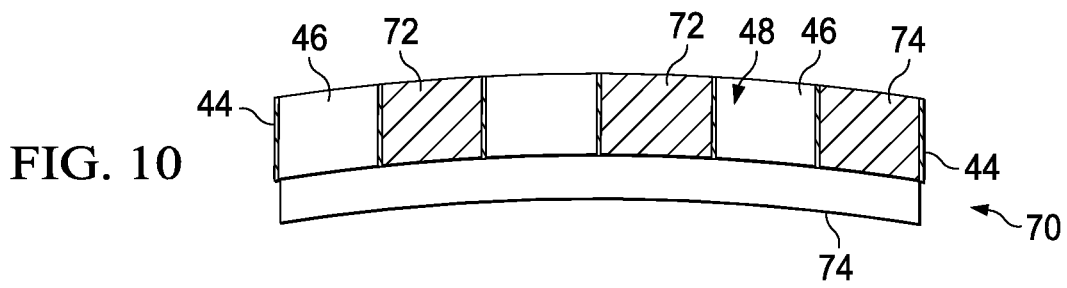
FIG. 10 is an illustration similar to FIG. 9 but showing the cascade grid panel having been located on the hard tooling.
Figure 11:
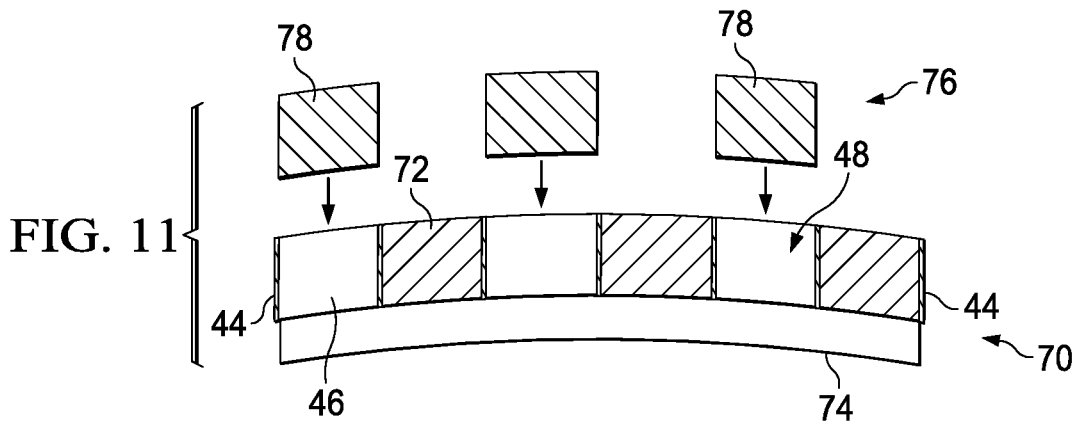
FIG. 11 is an illustration similar to FIG. 10 but showing expandable soluble mandrels about to be inserted into open vane cavities in the cascade grid panel.
Figure 12:
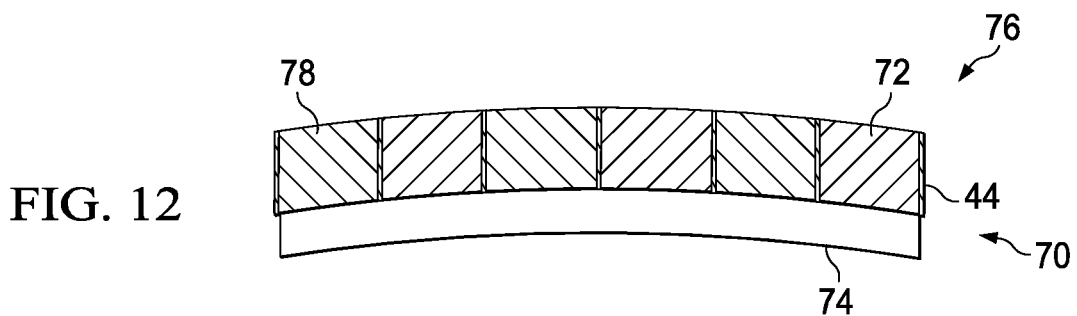
FIG. 12 is illustration similar to FIG. 11 but showing the expandable soluble mandrels having been inserted into the open vane cavities.

For example, as shown in FIG. 9, the cascade grid panel assembly 66 may be preassembled, following which, as shown in FIG. 9 the hard tool inserts 72 are inserted 68 into alternating ones of the vane cavities 48. FIG. 10 shows the hard tool inserts 72 having been inserted into the vane cavities 48, and the cascade grid panel assembly 66 resting on the tool base 74. Next, as shown in FIG. 11, the expandable soluble mandrels 78 are inserted into the remaining open vane cavities 48, following which, as shown in FIG. 12, all of the vane cavities 48 have tool inserts therein and the assembly of the tooling and the grid panel assembly 66 is ready to be placed in a compression molding apparatus (not shown) to carry out the final co-consolidation process. Other techniques for assembling the components of the grid panel assembly 66 with the tooling are possible.

Figure 13:
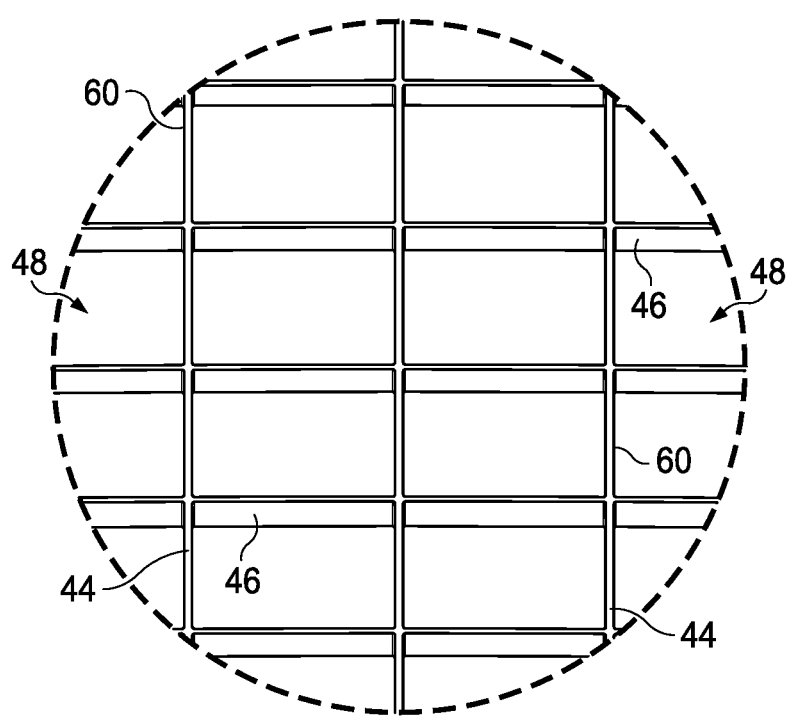
FIG. 13 is an illustration of a top plan view showing the pre-consolidated vanes having been assembled with the pre-consolidated strongback assembly in preparation for co-consolidation.
Figure 14:
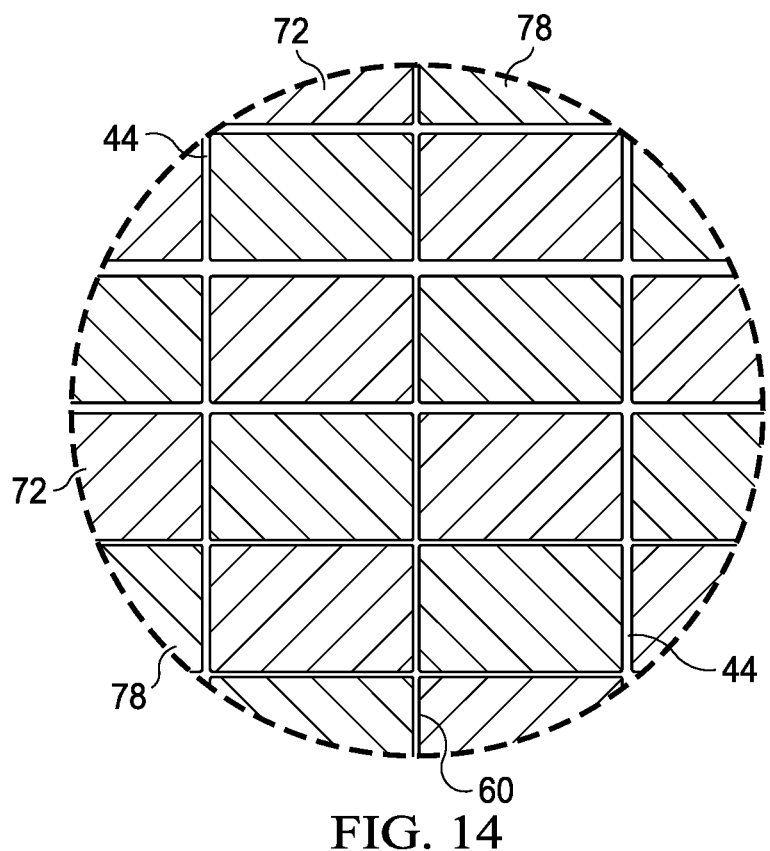
FIG. 14 is an illustration similar to FIG. 13, but showing the alternating locations of hard tool inserts and expandable soluble mandrels having been inserted into the vane cavities.

FIG. 13 illustrates a portion of the assembled prior to the tool inserts 72, 78 being inserted into the vane cavities 48. In one embodiment, as shown in FIG. 14, the tool inserts 72, 78 may be arranged to be placed in an alternating manner in the vane cavities 48. During the assembly of the tooling with the components of the grid panel assembly 66, the hard tool inserts 72 function to index the vane subassemblies 60 relative to each other and relative to the strongback assembly 56.

Figure 15:
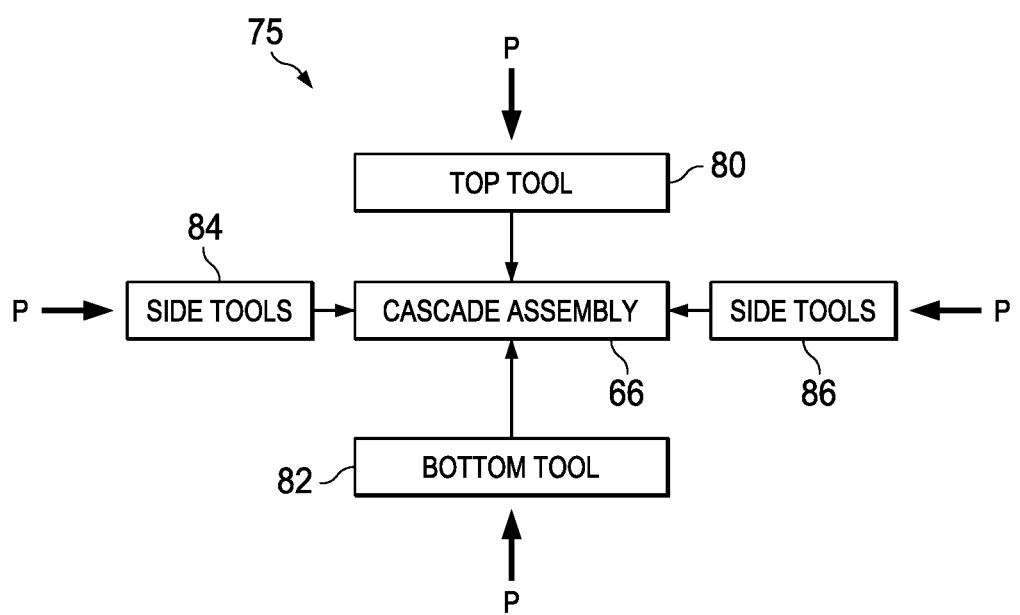
FIG. 15 is an illustration of a block diagram broadly showing the components of tooling used to co-consolidate the pre-consolidated vanes and the pre-consolidated strongback assembly.

Referring now to FIG. 15, with the tool inserts 72 and soluble mandrels 78 having been inserted into alternating ones of the vane cavities 48 of the cascade grid assembly 66, the cascade grid assembly 66 may be placed in a consolidation tool and loaded into a compression press 75, which applies pressure P to the cascade grid assembly 66 using a top tool 80, a bottom tool 82 and side tools 84, 86. The use of alternating hard tool inserts 72 and soluble mandrels 78 assists in locating the components of the grid panel 28 prior to co-consolidation to provide repeatability and accurate placement, and help assure that the components do not float, move or re-melt during the final co-consolidation phase.

Figure 16:
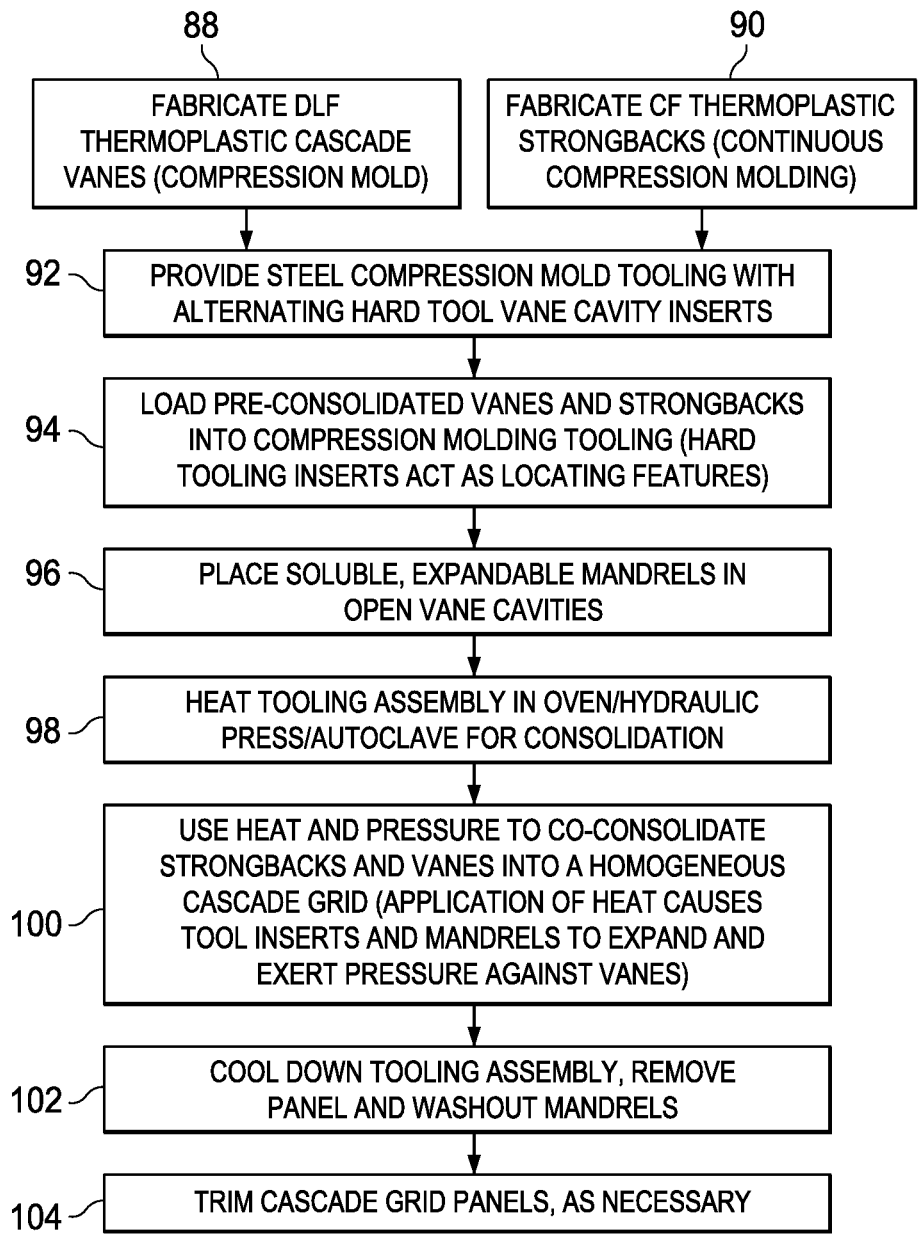
FIG. 16 is an illustration of a flow diagram broadly showing the steps of a method of fabricating the cascade grid panels.

FIG. 16 broadly illustrates the overall steps of a method of fabricating cascade grid panels 28 of the type described above. At 88, the vanes 46 may be fabricated by compression molding a suitable thermoplastic resin reinforced with discontinuous long fibers 35. Similarly, in step 90 the strongbacks 44 may be fabricated by continuous compression molding a suitable thermoplastic resin reinforced with continuous fibers 45, such as unidirectional prepreg. With the vanes and the strongbacks 44 having been separately pre-consolidated in steps 88 and 90, steel compression mold tooling is provided which includes hard tool cavity inserts 72. At step 94, the pre-consolidated vanes 46 and strongbacks 44 are loaded into compression mold tooling, where the hard tool inserts 72 act as indexing or locating features that properly locate the vanes 46 relative to each other and relative to the strongbacks 44.

Next, at step 96, the second set of tool inserts the form of expandable soluble mandrels 78 are inserted into the remaining open vane cavities that are not already filled with hard tool inserts 72 in order to fill these open vane cavities. At step 98, the tooling is heated in an oven, a heated hydraulic press and/or an autoclave to the melting temperature of the thermoplastic, in preparation for final consolidation. At 100, heat and pressure are used to co-consolidate the strongbacks 44 and the vanes 46 into a homogeneous cascade grid panel assembly 28, during which the hard tool inserts 72 and the mandrels 78 expand to exert pressure against the vanes 46.

The pressure applied against the vanes 46 presses the vanes 46 outward against the IML (inner mold line) of the strongback assembly 56, thereby co-consolidating the vanes 46 and the strongbacks 44 into a homogeneous continuous fiber and discontinuous fiber, all thermoplastic composite cascade grid panel 28. With the vanes 46 and the strongbacks 44 fully co-consolidated, then, at 102 the tooling is cooled down, thereby cooling the vanes 46 and the strongbacks 44. Then the consolidated cascade grid panel 28 is removed from the tooling and the mandrels 78 are washed away. At 104, the consolidated cascade grid panel assembly 28 is trimmed, as necessary.

Figure 17:
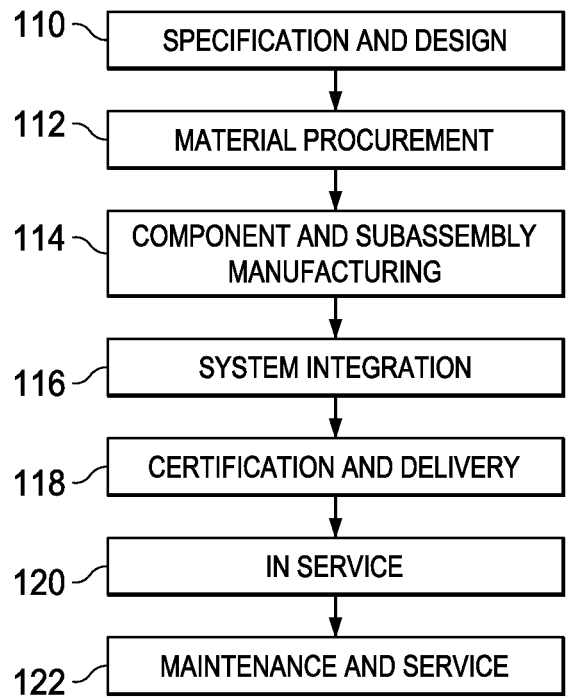
FIG. 17 is an illustration of a flow diagram of aircraft production and service methodology.
Figure 18:
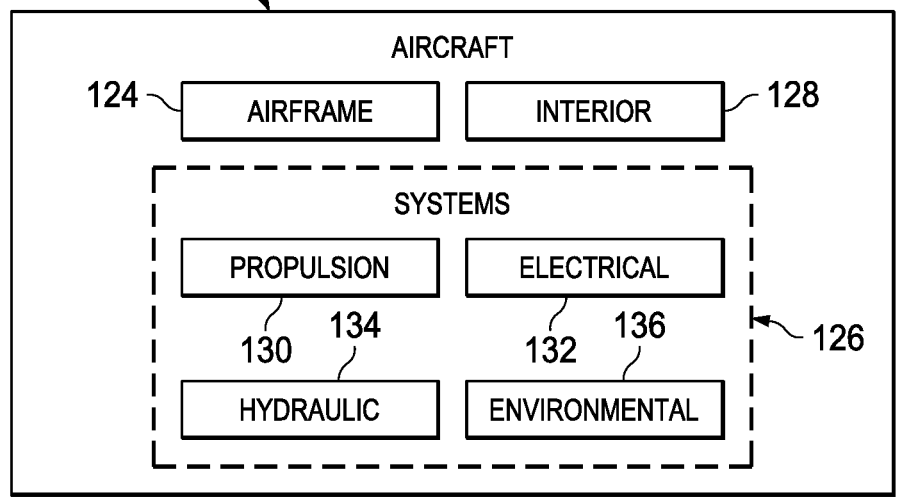
FIG. 18 is an illustration of a block diagram of an aircraft.

Embodiments of the disclosure may find use in a variety of potential applications, particularly in the transportation industry, including for example, aerospace, marine, automotive applications and other application where grid-type panels may be used. Thus, referring now to FIGS. 17 and 18, embodiments of the disclosure may be used in the context of an aircraft manufacturing and service method 106 as shown in FIG. 17 and an aircraft 108 as shown in FIG. 18. Aircraft applications of the disclosed embodiments may include, for example, without limitation, thrust reversers for jet engines. During pre-production, exemplary method 106 may include specification and design 110 of the aircraft 108 and material procurement 112. During production, component and subassembly manufacturing 114 and system integration 116 of the aircraft 108 takes place. Thereafter, the aircraft 108 may go through certification and delivery 118 in order to be placed in service 120. While in service by a customer, the aircraft 108 is scheduled for routine maintenance and service 122, which may also include modification, reconfiguration, refurbishment, and so on.

Each of the processes of method 106 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 18, the aircraft 108 produced by exemplary method 106 may include an airframe 124 with a plurality of systems 126 and an interior 128. Examples of high-level systems 126 include one or more of a propulsion system 130, an electrical system 132, a hydraulic system 134 and an environmental system 136. Any number of other systems may be included. Although an aerospace example is shown, the principles of the disclosure may be applied to other industries, such as the marine and automotive industries.

Systems and methods embodied herein may be employed during any one or more of the stages of the production and service method 106. For example, components or subassemblies corresponding to production process 114 may be fabricated or manufactured in a manner similar to components or subassemblies produced while the aircraft 108 is in service. Also, one or more apparatus embodiments, method embodiments, or a combination thereof may be utilized during the production stages 114 and 116, for example, by substantially expediting assembly of or reducing the cost of an aircraft 108. Similarly, one or more of apparatus embodiments, method embodiments, or a combination thereof may be utilized while the aircraft 108 is in service, for example and without limitation, to maintenance and service 122.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus for forming a cascade for a jet engine thrust reverser, the apparatus comprising:
a tool including a plurality of hard tool inserts fixed on the tool in relationship to each other, wherein the hard tool inserts are configured to fit within vane cavities defined by:
a plurality of strongbacks that are spaced apart to form slots between adjacent ones of the strongbacks; and
a plurality of vanes arranged and spaced within the slots formed by the strongbacks,
wherein the hard tool inserts are spaced apart on the tool to insert into alternating ones of the cavities; and
a plurality of expandable mandrels distinct from the hard tool inserts and configured to fit within the remaining ones of the cavities disposed between the alternating cavities defined by the strongbacks and vanes, wherein the mandrels are configured to expand in response to heat and pressure to compress the vanes against the strongbacks and hard tool inserts, and wherein the hard tool inserts and mandrels each have a cross-sectional geometry substantially matching that of their respective vane cavities.

2. The apparatus of claim 1, wherein the mandrels are water soluble.

3. The apparatus of claim 1, wherein the tool further comprises a base to which the plurality of hard tool inserts are fixed.

4. The apparatus of claim 1, wherein the tool further comprises:
a base onto which the plurality of vanes and the plurality of strongbacks can be preassembled into a grid panel.

5. The apparatus of claim 4, wherein the hard tool inserts function to index subassemblies of the vanes relative to each other and relative to the strongbacks.

6. The apparatus of claim 4, wherein the base is curved in a side-circumferential direction relative to the cascade.

7. The apparatus of claim 1, wherein the hard tool inserts and mandrels are configured to fit into ones of the cavities defined by ones of the vanes arranged inclined relative to a radial-up direction.

8. The apparatus of claim 1, wherein the hard tool inserts and mandrels are configured to fit into ones of the cavities defined by ones of the vanes that are cup shaped.

9. The apparatus of claim 1, further comprising a compression press configured to apply pressure to the strongbacks and vanes with the hard tool inserts and mandrels inserted into the cavities.

10. The apparatus of claim 9, wherein the compression press is configured to apply pressure against the strongbacks and vanes from a top direction, a bottom direction, and side directions.

11. The apparatus of claim 9, further comprising a consolidation tool configured to hold a cascade grid assembly of the vanes and strongbacks with the hard tool inserts and mandrels inserted into the alternating and remaining ones of the cavities, wherein the consolidation tool is configured to be loaded into the compression press.

12. The apparatus of claim 1, wherein the hard tool inserts and mandrels prevent components of the cascade from floating, moving, or re-melting during a step of co-consolidation in which said heat and pressure are applied.

13. The apparatus of claim 1, wherein the tool including the hard tool inserts is a steel compression mold tooling.

14. An apparatus for forming a cascade for a jet engine thrust reverser, the apparatus comprising:
  a base onto which a cascade assembly of a plurality of strongbacks and vanes can be preassembled into a grid panel, wherein the base is curved in a side-circumferential direction relative to the cascade;
  a plurality of hard tool inserts fixed on the base in relationship to each other, wherein the hard tool inserts are configured to fit within vane cavities of the cascade defined both by slots formed between adjacent ones of the strongbacks and by vanes arranged and spaced within the slots formed by the strongbacks, and wherein the hard tool inserts are spaced apart on the base to insert into alternating ones of the cavities; and
  a plurality of expandable mandrels distinct from the hard tool inserts and configured to fit within the remaining ones of the cavities disposed between the alternating cavities defined by the strongbacks and vanes, wherein the mandrels are configured to expand in response to heat and pressure to compress the vanes against the strongbacks and hard tool inserts, and wherein the hard tool inserts and mandrels each have a cross-sectional geometry substantially matching that of their respective vane cavities.

15. The apparatus of claim 14, wherein the mandrels are water soluble.

16. The apparatus of claim 14, wherein base on which the hard tool inserts are spaced apart is the base of a steel compression mold tooling.

17. The apparatus of claim 14, wherein the hard tool inserts and mandrels are configured to fit into ones of the cavities defined by ones of the vanes arranged inclined relative to a radial-up direction.

18. The apparatus of claim 14, wherein the hard tool inserts and mandrels are configured to fit into ones of the cavities defined by ones of the vanes that are cup shaped.

19. The apparatus of claim 14, further comprising a compression press configured to apply pressure to the strongbacks and vanes with the hard tool inserts and mandrels inserted into the cavities, wherein the compression press is configured to apply pressure against the strongbacks and vanes from a top direction, a bottom direction, and side directions.

20. The apparatus of claim 19, further comprising a consolidation tool configured to hold the cascade grid assembly of vanes and strongbacks with the hard tool inserts and mandrels inserted into the alternating and remaining ones of the cavities, wherein the consolidation tool is configured to be loaded into the compression press.

* * * * *